United States Patent [19]
Caillaut et al.

[11] Patent Number: 5,530,344
[45] Date of Patent: Jun. 25, 1996

[54] ENCODER ELEMENT FOR A ROLLING-CONTACT BEARING EQUIPPED WITH AN INFORMATION SENSOR ASSEMBLY AND ROLLING-CONTACT BEARING INCLUDING SUCH AN ENCODING ELEMENT

[75] Inventors: Claude Caillaut, Saint-Roch; Christian Rigaux, Artannes-sur-Indre; Pascal Lhote, Saint-Cyr-sur-Loire; Christophe Houdayer, Tours, all of France

[73] Assignee: SKF France, France

[21] Appl. No.: 312,802

[22] Filed: Sep. 27, 1994

[30] Foreign Application Priority Data

Oct. 6, 1993 [FR] France ................... 93 11924

[51] Int. Cl.$^6$ .................. G01P 3/487; F16C 41/04; F21B 33/02
[52] U.S. Cl. .................. 324/174; 384/448; 277/80
[58] Field of Search .................. 324/173, 174, 324/207.25, 262; 384/448, 446; 277/80, 181, 182

[56] References Cited

U.S. PATENT DOCUMENTS

| | | | |
|---|---|---|---|
| 4,795,278 | 11/1989 | Hayashi . | |
| 4,850,722 | 7/1989 | Bayer | 384/448 |
| 4,948,277 | 8/1990 | Alff | 384/448 |
| 4,969,753 | 11/1990 | Kato et al. | 384/448 |
| 5,026,178 | 6/1991 | Ballhaus | 384/448 |
| 5,166,611 | 11/1992 | Kujawa, Jr. et al. | 324/173 |
| 5,309,094 | 5/1994 | Rigaux et al. | 324/174 |
| 5,325,055 | 6/1994 | Geringer | 324/174 |

FOREIGN PATENT DOCUMENTS

| | | |
|---|---|---|
| 0250275 | 12/1987 | European Pat. Off. . |
| 0437796 | 7/1991 | European Pat. Off. . |
| 0522933 | 1/1993 | European Pat. Off. . |
| 2664691 | 1/1992 | France . |

Primary Examiner—Sandra L. O'Shea
Assistant Examiner—Roger Phillips
Attorney, Agent, or Firm—Beveridge, DeGrandi, Weilacher & Young

[57] ABSTRACT

The encoder element (8) for a rolling-contact bearing equipped with an information sensor assembly is rendered integral with a rotating race of the bearing and interacts with a sensor of the said information sensor assembly in order to detect the speed of rotation of the bearing. It comprises an annular target (13) made of ferromagnetic material provided with a cylindrical bearing surface (13a) for mounting on the rotating race of the bearing and with a flat disc-shaped radial part (13b) with windows (13c) or slots of identical size and uniformly distributed along the circular path, and an axially magnetized bipolar ring (14) provided with axial crenellations (14b) which are uniformly and circumferentially distributed and which penetrate axially into the said windows or slots in the target.

20 Claims, 9 Drawing Sheets

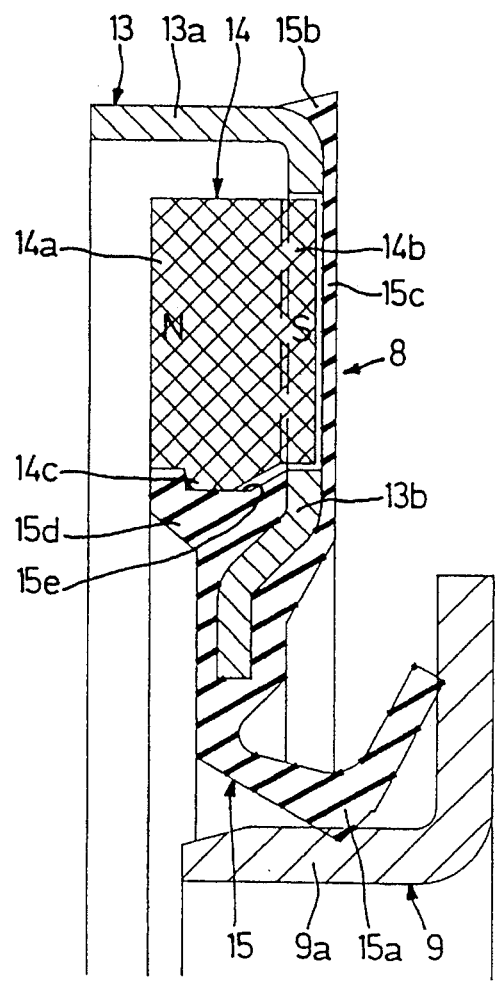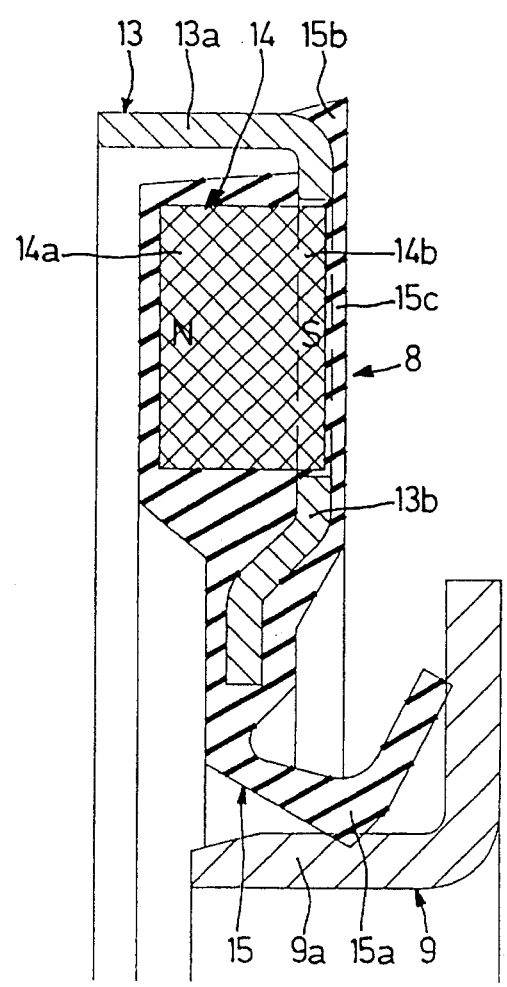

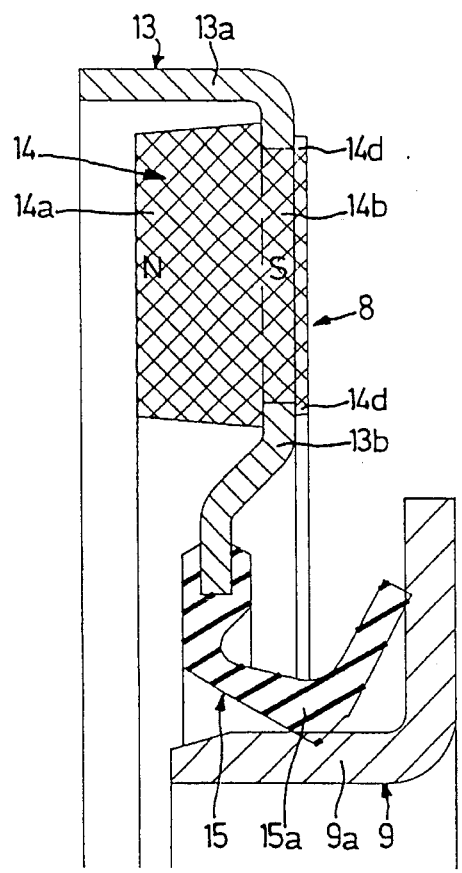
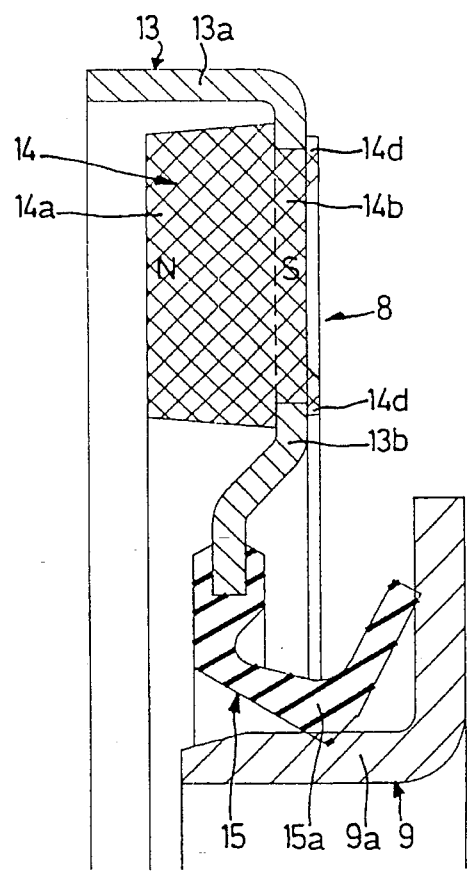
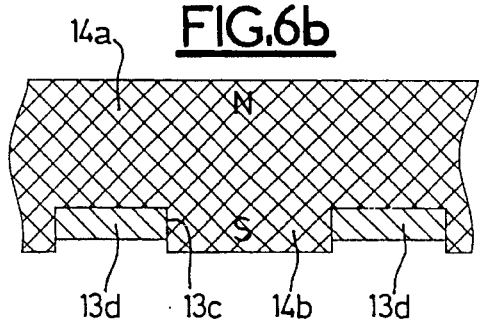
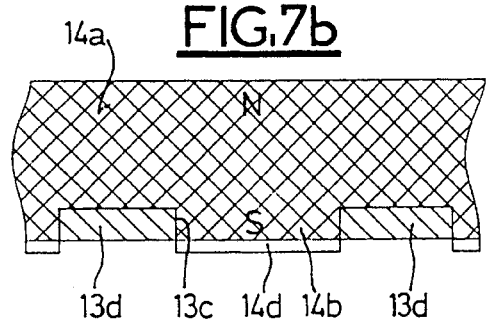

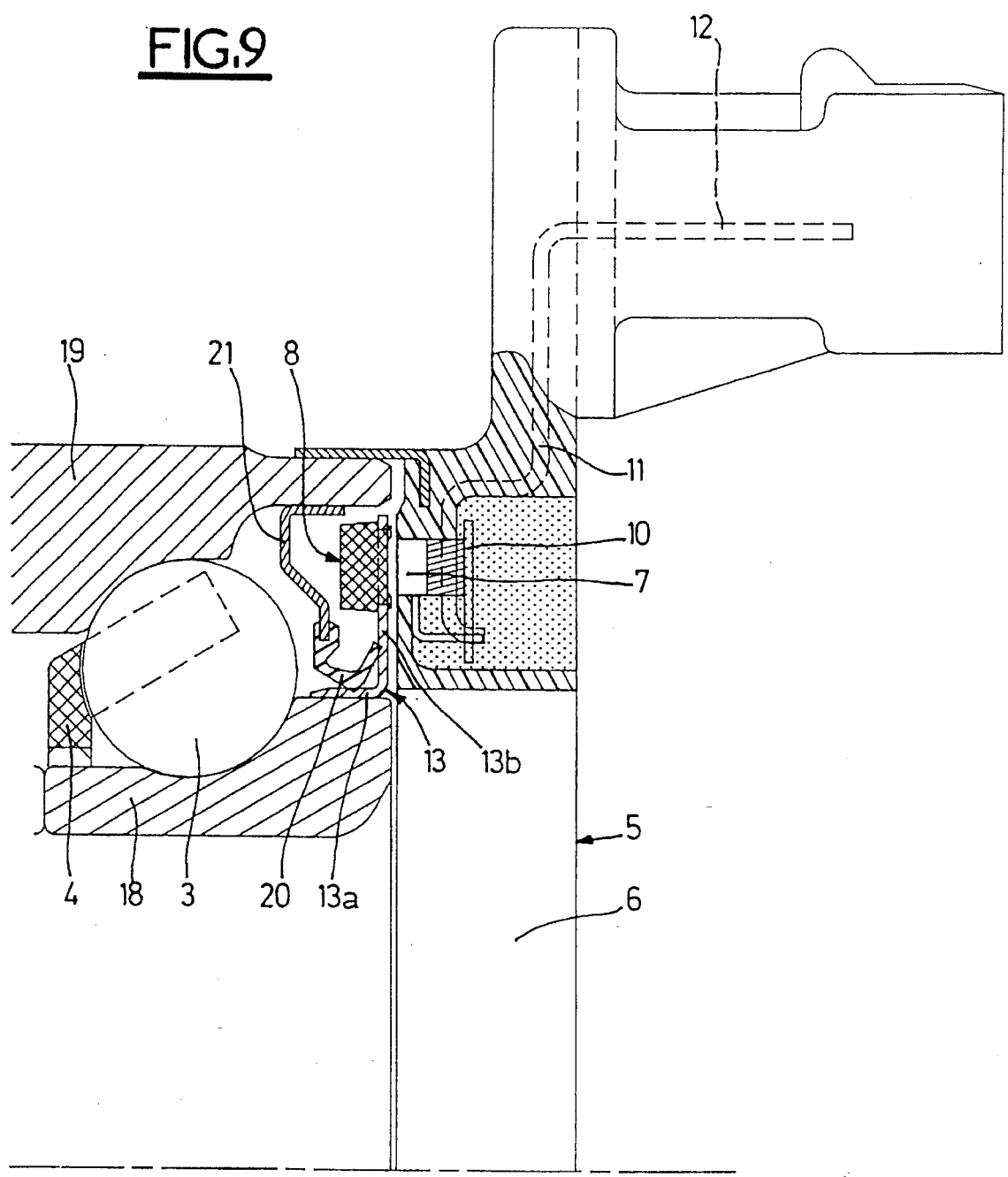

ENCODER ELEMENT FOR A ROLLING-CONTACT BEARING EQUIPPED WITH AN INFORMATION SENSOR ASSEMBLY AND ROLLING-CONTACT BEARING INCLUDING SUCH AN ENCODING ELEMENT

BACKGROUND

1. The Field of the Invention

The present invention relates to the field of information sensors for rolling-contact bearings. It relates more particularly to an encoder element intended to interact with a sensor of active type such as Hall-effect or magnetoresistive probes, for the purpose of detecting the speed of rotation of the bearing.

2. The Prior Art

Information sensors for bearings are currently used as devices for detecting the speed of rotation of the bearing for a motor vehicle equipped with a wheel anti-lock braking system or ABS. The information sensor assemblies comprise an encoder element rendered integral with a rotating race of the bearing and a sensor mounted so that it is stationary with respect to a non-rotating race of the bearing. The encoder element and the sensor are located facing one another axially or radially with a slight air gap. The encoder element driven in terms of rotation by the rotating race creates variations in magnetic field. The sensor detects these variations in magnetic field, converting them into an electrical signal the frequency of which is representative of the speed of rotation of the bearing. The signal coming from the sensor is transmitted via an electrical cable to a control and processing unit of the vehicle.

French Patent Application No. 2,599,794 makes known an information sensor assembly for a bearing in which the encoder element is produced in the form of a multipolar ring integral with the rotating race of the bearing and filing past, in terms of rotation, in front of an active sensor of the Hall-effect probe type. However, the manufacture of a multipolar ring, especially when the ring includes a great number of alternate magnetic poles, is relatively tricky from the point of view of the accuracy of the magnetization. The accuracy of the magnetization of the multipolar ring is essential to ensure a good detection signal which requires the smallest possible spread in the dimensional and magnetic characteristics of the poles of the multipolar ring.

OBJECTS OF THE INVENTION AND BRIEF SUMMARY OF THE INVENTION

The object of the present invention is to overcome the drawbacks of the aforementioned art by proposing an encoder element including magnetized zones which exhibit very little spread both from the dimensional point of view and from the point of view of the magnetic characteristics.

Another object of the invention is to produce a composite encoder element of which the magnetization is simple.

The encoder element for a bearing with an information sensor, according to the invention, includes an annular target made of ferromagnetic material and an axially magnetized bipolar ring rendered integral with the ferromagnetic target.

The ferromagnetic target is provided with a cylindrical bearing surface in order to be mounted on the rotating race of the bearing and with a flat disc-shaped radial part equipped with windows or slots of identical size and which are uniformly distributed along a circular path.

The bipolar ring with axial magnetization exhibits a solid base and axial crenellations of teeth which are uniformly distributed along the base. The free end of the axial crenellations exhibits a magnetization of the same polarity and these preferably constitute the S poles. The solid annular base then on its free side exhibits magnetization of N polarity. The bipolar ring is rendered integral with the radial part of the ferromagnetic target, the axial crenellations of the bipolar ring penetrating axially into the windows or slots in the target.

The sensor of the information sensor assembly is mounted so that it is stationary with respect to the non-rotating ring of the bearing and points axially facing the radial part of the ferromagnetic target of which the windows or slots frame the magnetized axial crenellations of the bipolar ring. Thus, a rotation of the rotating race of the bearing causes the encoder element to file past in front of the sensor, the magnetized free end of the axial crenellations of the bipolar ring and the ferromagnetic radial strips which separate the windows of the target passing alternately in front of the sensor element. A variation in magnetic field thus brought about is detected by the sensor which in turn provides an electrical signal, the pulse frequencies of which are representative of the speed of rotation of the encoder element.

By virtue of such a composite structure of the encoder element, it is easy to obtain the windows or slots on the magnetic target accurately, for example by stamping a ferromagnetic steel sheet. It is also easy to obtain axial magnetization in order to obtain the bipolar ring with the axial crenellations exhibiting the same magnetic polarity. The mechanical accuracy with which the windows in the target are cut out makes it possible also to ensure the dimensional accuracy of each pole made up of each magnetized axial crenellation (windows of identical size and uniformly distributed along a circular path).

Likewise, the ferromagnetic material of the target constitutes a magnetic circuit for the magnetic field lines, which eliminates the spread in the magnetic field lines at the radial strips separating the windows of the target. In other words, the magnetic field lines do not escape from these ferromagnetic strips towards the sensor. The axial magnetization of the bipolar ring for its part guarantees a constant value of magnetic field at each window. The accuracy and quality of detection is thus enhanced because the difference in level of the magnetic field with regard to a magnetized axial crenellation and to a ferromagnetic strip of the target is accentuated in this way and results in very clean breaks between these adjacent zones.

The invention will be better understood upon studying the detailed description of a few embodiments which are not in any way taken as a limitation, and illustrated by the appended drawings.

BRIEF DESCRIPTION OF THE DRAWINGS

FIGS. 8 and 9 show two specific configurations of the encoder element of the invention incorporated into a bearing.

DETAILED DESCRIPTION OF THE PREFERRED EMBODIMENTS

Figure 1:
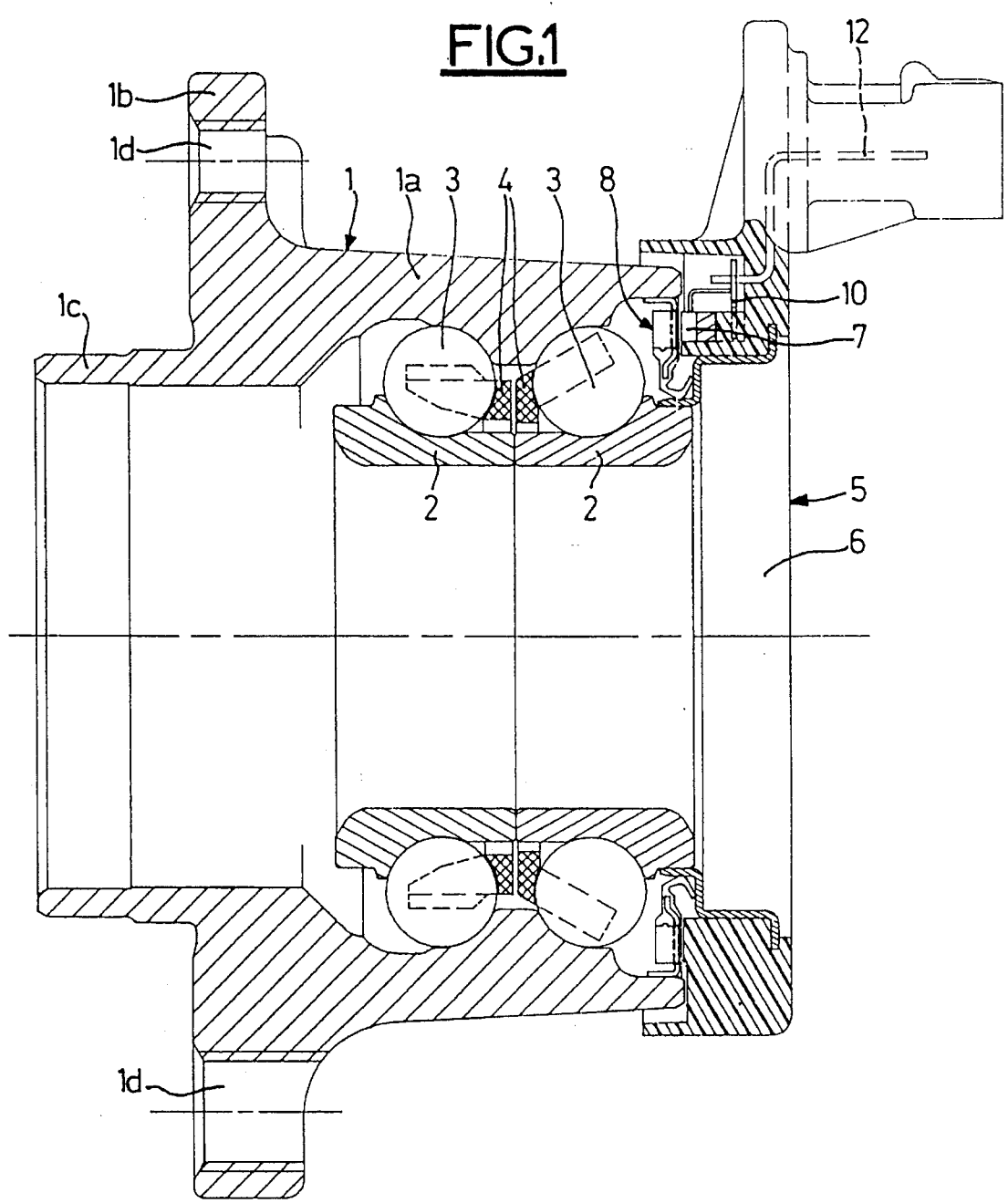
FIG. 1 is a diagrammatic view in axial section of a rolling-contact bearing equipped with an information sensor assembly according to the invention.

FIG. 1 represents a rolling-contact bearing for wheels of motor vehicles. The bearing comprises a rotating outer race 1, two non-rotating inner half-races 2 and two rows of rolling balls 3 located between the rotating race 1 and non-rotating race 2 and spaced out circumferentially by an annular cage 4. The rotating outer race 1 has a substantially cylindrical rolling portion 1a, a radial collar 1b and a tubular bearing surface 1c opposite the rolling portion 1a with respect to the radial collar 1b. A wheel, not represented, is mounted around the tubular bearing surface 1c by means of bolts which are not represented, passing through the tapped holes 1d in the radial collar 1b. An information sensor 5 comprising a plastic annular sensor carrier 6, a sensor 7 and an encoder element 8, is mounted on one side of the bearing.

Figure 2:
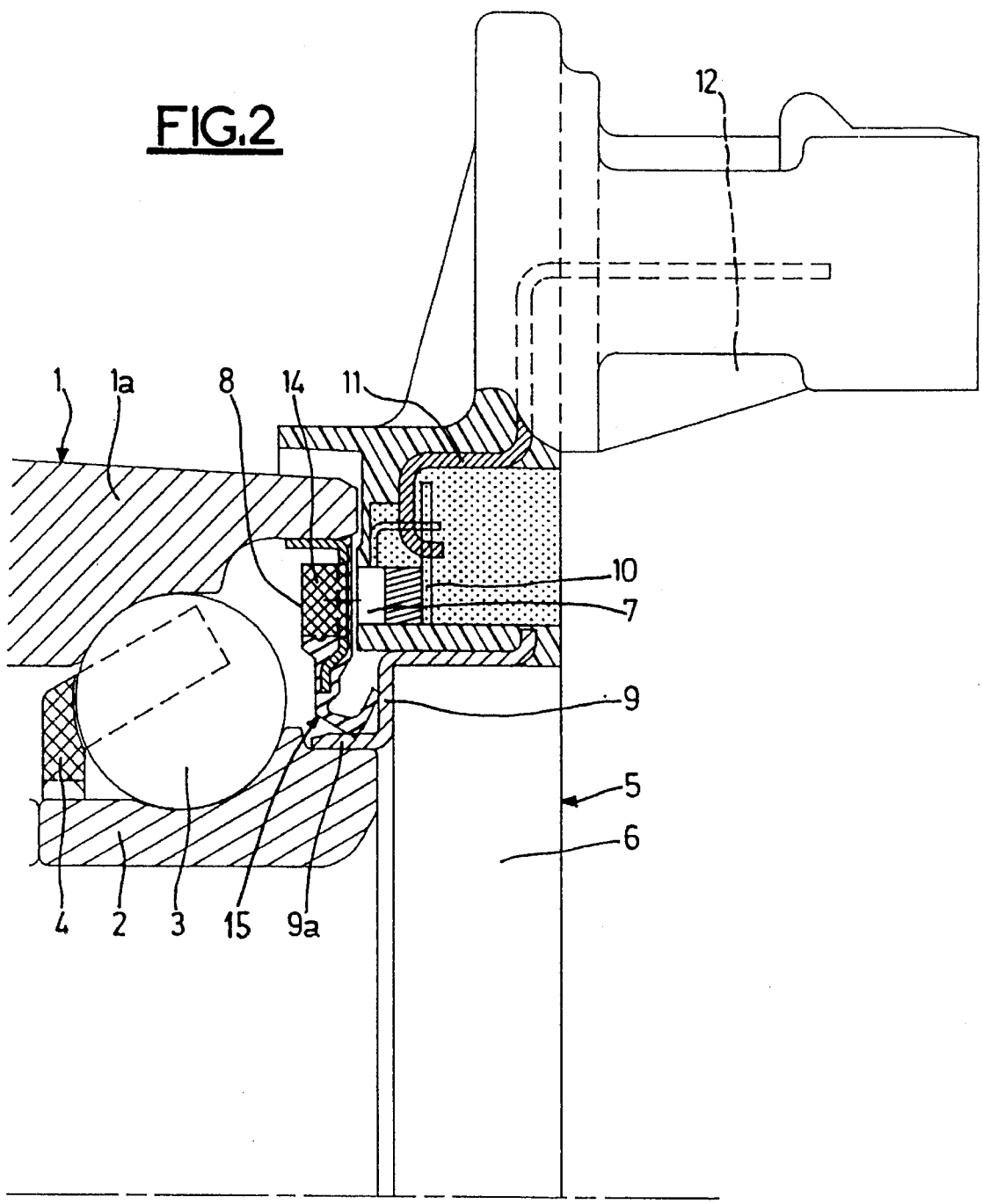
FIG. 2 is a detailed view of FIG. 1 showing the information sensor assembly of the invention.

As can be seen in FIG. 2, the sensor carrier 5 comprises an annular metal support 9 made of steel sheet which comprises a cylindrical bearing surface 9a for mounting, pushed on axially at one end of the non-rotating inner race 2. The sensor 7 is connected to an integrated circuit 10, which is in turn connected by an electrical cable 11 to an electrical connector 12. The encoder element 8 is pushed axially into one end of the rotating outer race 1 and driven in terms of rotation by the latter in order to create disturbances in magnetic field in the sensor 7 which is, for example, a Hall-effect probe.

Figure 3:
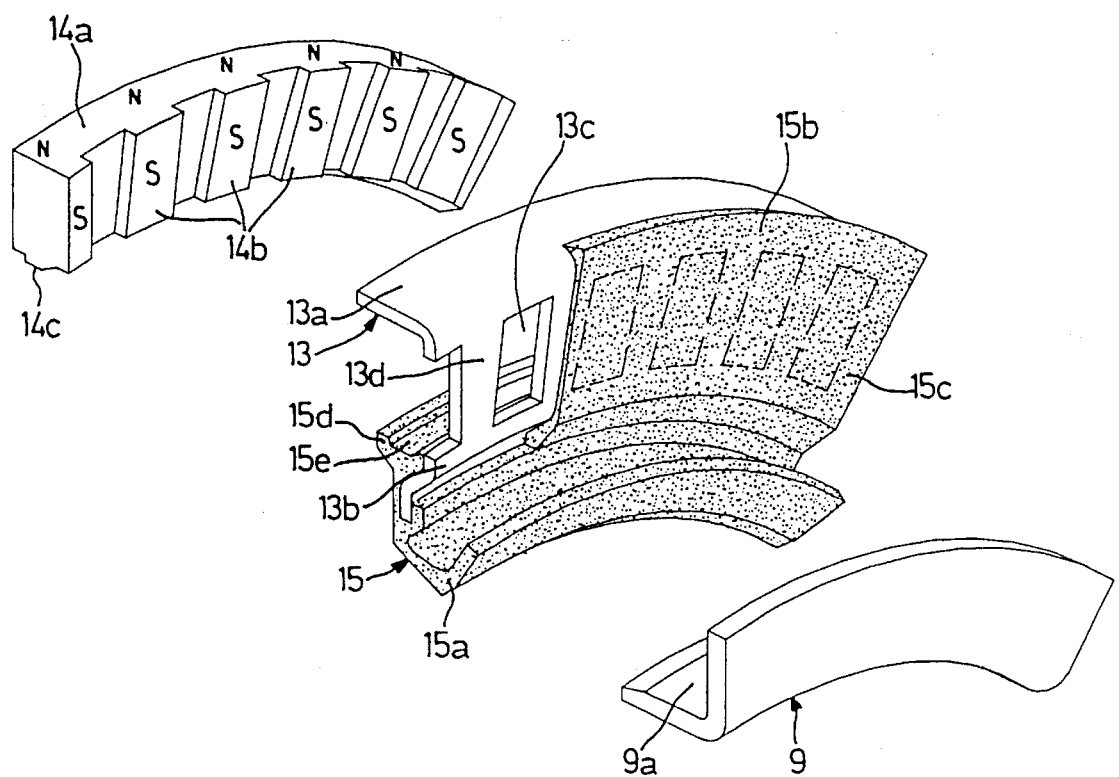
FIG. 3 is an exploded partial view of the encoder element illustrated in FIG. 2, FIG. 4 diagrammatically shows a first embodiment of the encoder element of the invention, FIG. 5 diagrammatically shows a second embodiment of the encoder element of the invention, FIG. 6A diagrammatically shows a third embodiment of the encoder element of the invention, FIG. 6B diagrammatically shows the magnet of the third embodiment of the encoder element of the invention, FIG. 7A diagrammatically shows a fourth embodiment of the encoder element of the invention, FIG. 7B diagrammatically shows the magnet of the fourth embodiment of the encoder element of the invention.

The structure of the encoder element 8 according to the embodiment illustrated in FIGS. 1 and 2 is represented in greater detail in FIGS. 3 and 4. The encoder element 8 is essentially made up of a metal target 13 and of a bipolar ring 14. Preferably, the encoder element 8 also includes a seal 15. The metal target 13 is produced from a ferromagnetic material in the form of an annular bent metal sheet. The target 13 comprises a cylindrical bearing surface 13a which can be pushed axially into the rotating race 1 of the bearing, and a radial part 13b in the form of a flat disc provided with a plurality of substantially rectangular windows 13c of identical size to one another and separated from one another by radial strips 13d which all exhibit the same circumferential width.

The inner edge of the radial part 13b of the target 13 is slightly curved and serves as anchorage for overmoulding the seal 15. The seal 15 exhibits an inner seal element 15a rubbing on the metal support 9 of the sensor carrier 6 (FIG. 2), an outer, static, seal 15b interacting with the end of the rotating race 1 of the bearing (FIG. 2), a continuous radial web 15c connecting the inner seal 15a and outer seal 15b, and a support part 15d in the form of an axial bearing surface with an annular peripheral groove 15e.

The bipolar ring 14 could be produced from any material capable of constituting a permanent magnet after magnetization: sintered material, elastomer filled with ferrite, plastic filled with ferrite (plastoferrite). The bipolar ring 14 exhibits a solid base 14a pointing towards the inside of the bearing and a plurality of axial crenellations 14b directed towards the sensor 7. Assembly between the bipolar ring 14 and the target 13 is manifested in the penetration of the axial crenellations 14b through the windows 13c, the axial crenellations 14b exhibiting substantially the same dimension as the windows 13c in order to fit in. The bipolar ring 14 is axially magnetized with the S poles on the axial crenellations and the N poles on the solid base 14a side.

In the mode illustrated in FIGS. 1 to 4, the bipolar ring 14 is produced separately from the metal target 13. The inner edge of the bipolar ring 14 exhibits an annular bead 14c or lugs which snap-fit into the annular groove 15e in the seal 15 when the ring 14 is mounted on the target 13. It goes without saying that other appropriate means for fastening the bipolar ring 14 onto the target 13 may be used (bonding, coating in a connection material, etc.).

By virtue of the seal 15 which is overmoulded onto the target 13, the bipolar ring 14 is protected effectively from the outside medium.

FIG. 5 shows an embodiment of the encoder element 8. In contrast to the embodiment previously described, the seal 15 is overmoulded after the bipolar ring 14 has been mounted on the metal target 13, the seal 15 completely enveloping the bipolar ring 14, and contributes to fastening the bipolar ring 14 onto the target 13. Apart from this difference, the embodiments illustrated in FIGS. 4 and 5 are practically identical.

In the case where a plastic filled with ferrite or an elastomer filled with ferrite is used to produce the ring 14, it is possible to overmould the ring 14 directly onto the metal target 13 so that the axial crenellations 14b are embedded in the windows 13c or slightly project axially with respect to the latter (FIGS. 6a, 6b, 7a, 7b). In this case, the axial magnetization of the ring 14 is achieved after the operation of overmoulding onto the target 13. The seal 15 is then reduced to the inner rubbing seal 15a. In order to allow the ring 14 and the target 13 to be rendered axially integral, the axial crenellations 14b overmoulded into the windows 13c may exhibit a radial overhang or tab 14d with respect to the windows of the target 13.

The embodiment illustrated in FIGS. 6a and 6b exhibits the axial crenellations 14b projecting axially with respect to the radial part of the target 13, the lower and upper edges of the free end of the axial crenellations 14b constituting the radial overhang 14d for attachment. In the embodiment illustrated in FIGS. 7a and 7b, the axial crenellations 14b do not project with respect to the radial part of the target 13 and only the upper and lower extensions of the free end of the axial crenellations 14b project axially and radially with respect to the windows 13c of the target 13 in order to constitute the radial overhang 14d for attachment.

Figure 8:
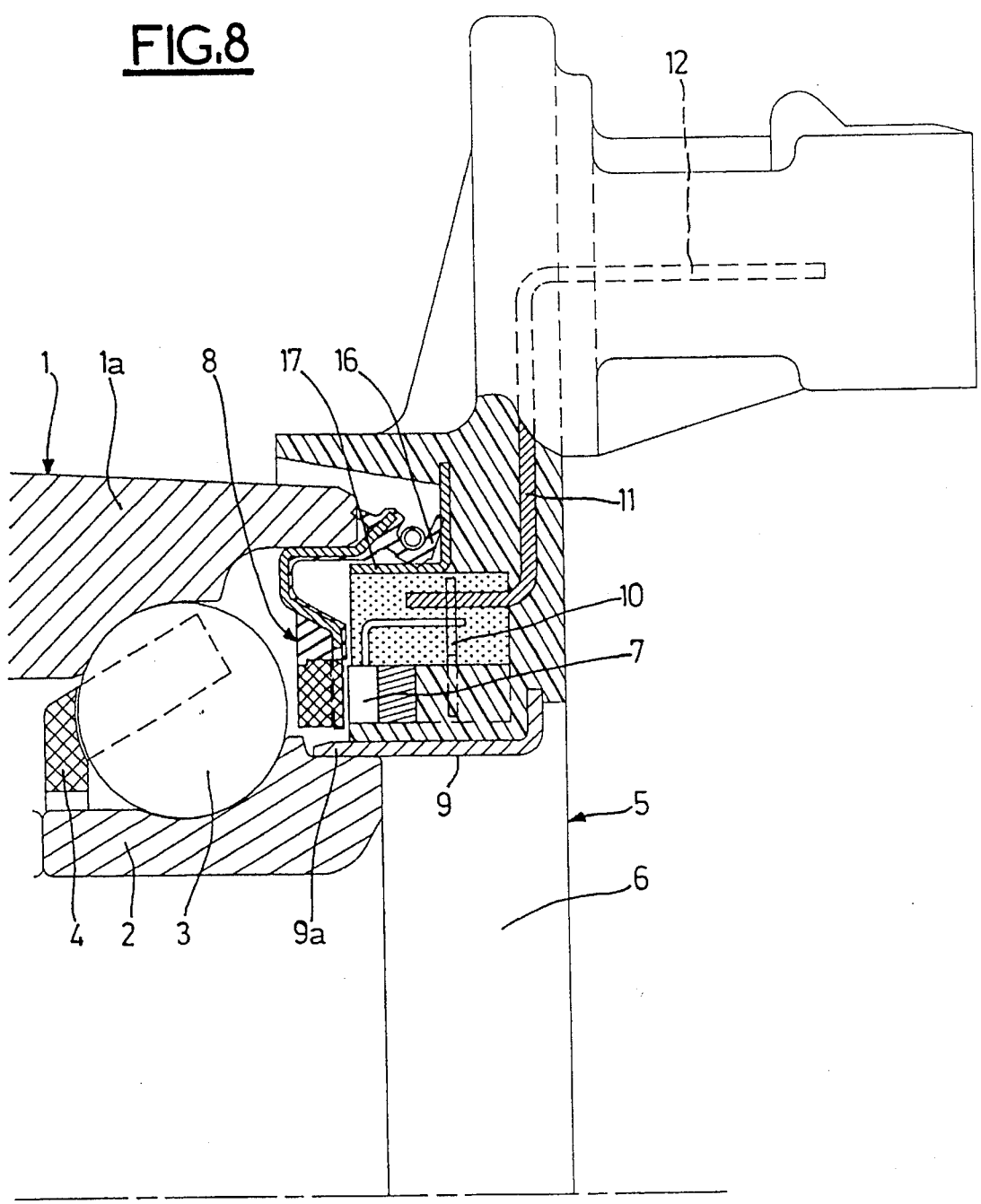

FIG. 8 shows a variant of the encoder element with respect to the one illustrated in FIGS. 1 to 4. In this embodiment, the rubbing seal 16 is in contact with an annular metal deflector 17 which forms part of the sensor carrier 6 in the extension of the end of the outer rotating race 1 of the bearing. Such a configuration further protects the information sensor assembly 5 from the outside environment by virtue of the rubbing seal 16.

FIG. 9 illustrates another embodiment of the encoder element 8 for a bearing in which the inner race 18 is a rotating race and in which the outer race 19 is stationary. The metal target 13 exhibits a cylindrical bearing surface 13a for mounting and a radial part 13b which does not have a seal. The seal 20 is overmoulded at the inner rim of a flange 21 mounted in the non-rotating outer race 19 of the bearing. The seal 20 is in rubbing contact with the metal target 13. The bipolar ring 14 is overmoulded directly onto the target 13 (similar to FIG. 7).

Figure 10A:
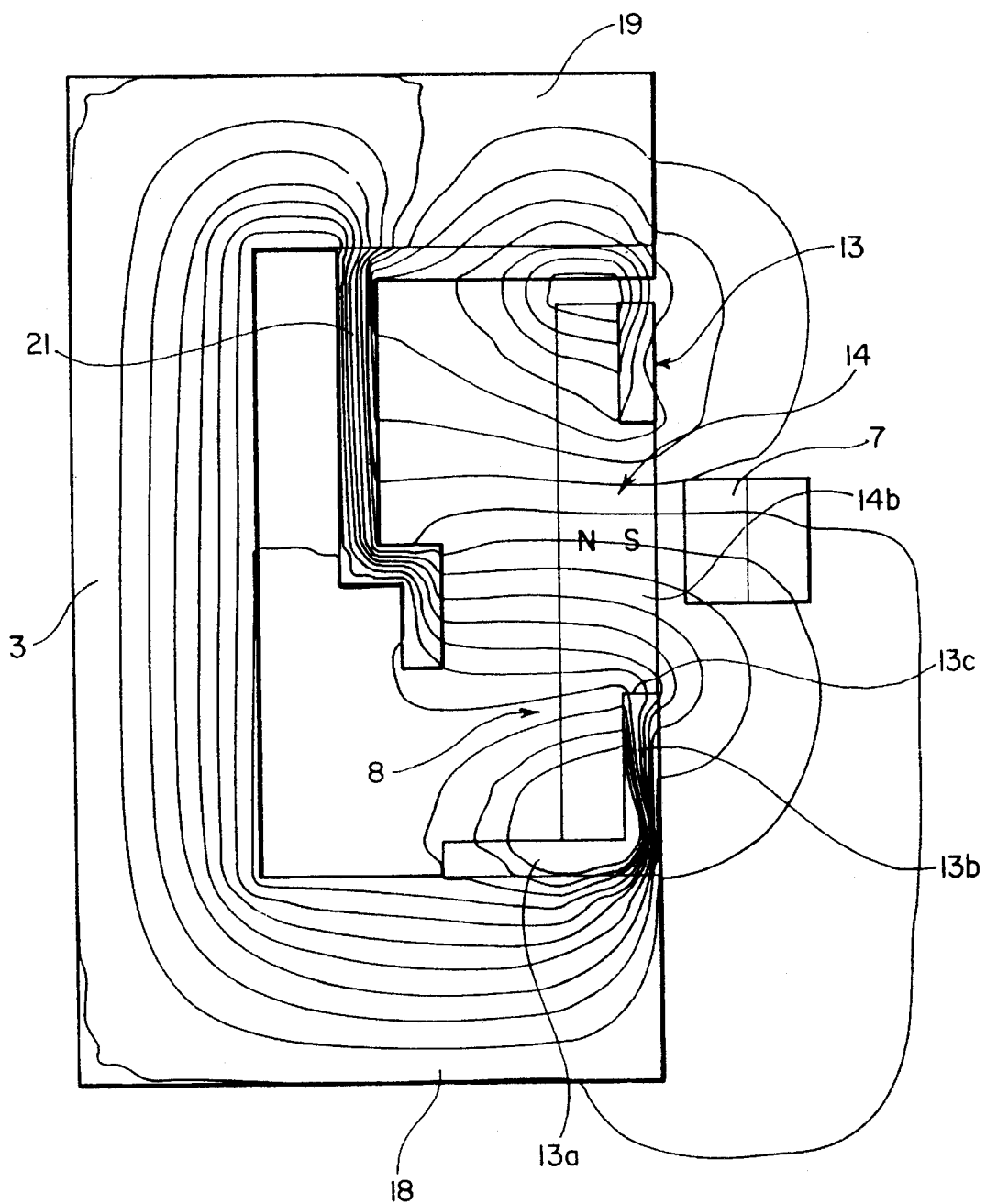
FIGS. 10a and 10b show the result of a modelling of the magnetic field lines obtained with the aid of the encoder element of the invention.
Figure 10B:
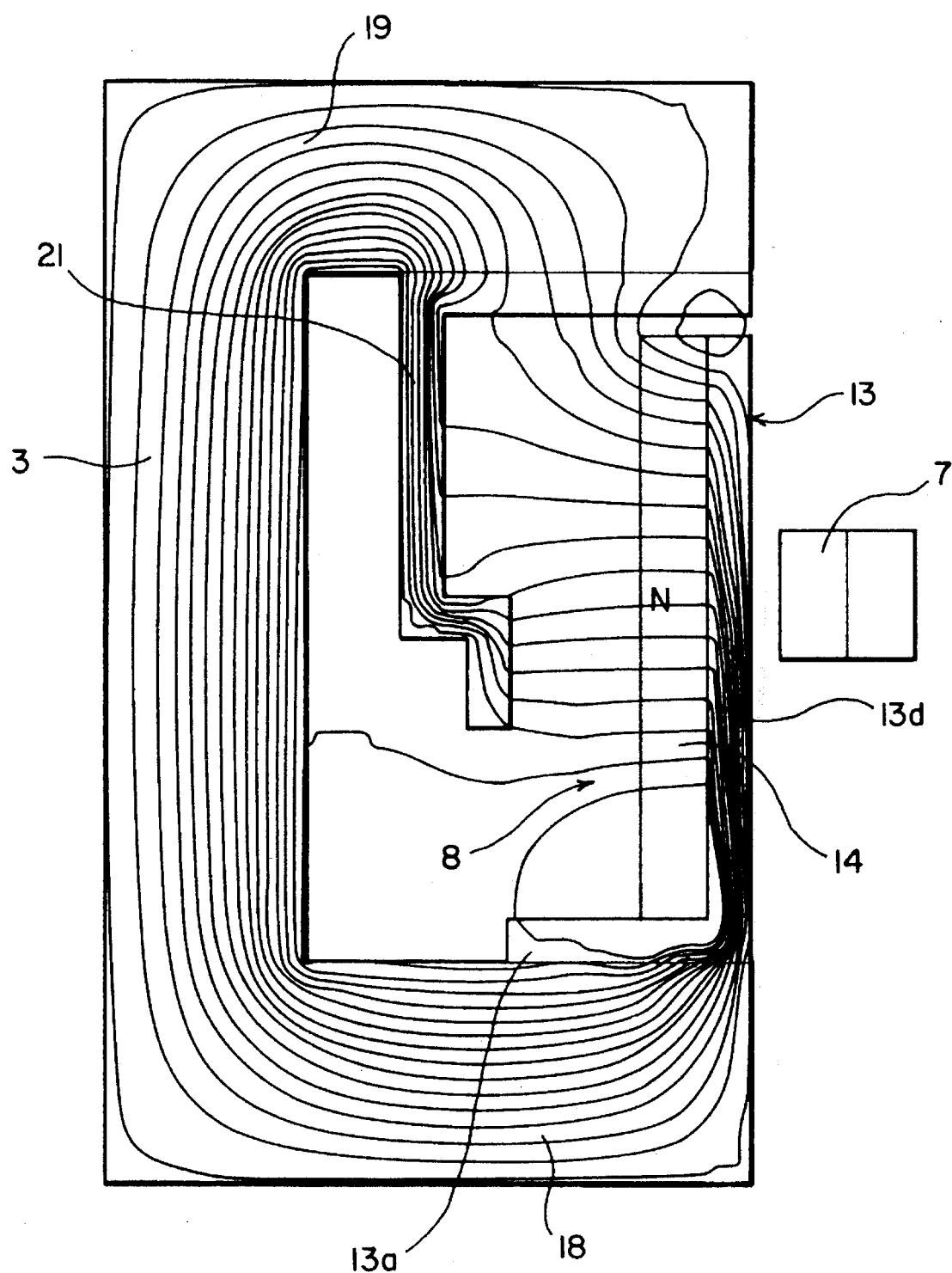

FIGS. 10a and 10b show a modelling of the magnetic field lines which are generated by the encoder element of the type represented in FIG. 9 according to the invention. The other embodiments illustrated and described previously operate in an entirely similar fashion.

Compared with FIG. 9, the magnetic circuit referenced 19, 3, 18 is made up of the non-rotating outer race 19, the rolling balls 3 and the rotating inner race 18 of the bearing. The metal support 21 for a seal is also a magnetic conductor in a way similar to the ferromagnetic target 13.

When the sensor 7 is opposite a window 13c, that is to say opposite an axial crenellation 14b of the bipolar ring 14, the magnetic field lines which are represented in a radial plane passing through the sensor 7 are indicated in FIG. 10. The intensity of the magnetic field, which intensity is detected by the sensor 7, is at its maximum value.

In the arrangement illustrated in FIG. 10b, the sensor 7 is facing a radial strip 13d separating two consecutive windows 13c of the ferromagnetic target 13. Owing to the magnetic conductive characteristics of the ferromagnetic strips 13d, the magnetic field lines are conveyed into the ferromagnetic strip 13d instead of escaping towards the outside. As a result, the sensor 7 does not detect the presence of the magnetic field.

Setting the encoder element 8 made up of the target 13 and of the bipolar ring 14 into rotation therefore leads to a significant variation in magnetic field at the sensor 7 located axially facing the encoder elements 8. In effect, the sensor 7 is subjected alternately to the magnetic field emitted by the polarized axial crenellations 14b passing through the windows 13c and to the absence of magnetic field at the radial strips 13d of the target. The sensor 7 therefore delivers an electrical signal of which the pulse frequency is proportional to the speed of rotation of the encoder element 8.

The axial magnetization of the ring 14 is particularly easy to achieve since simple axial bipolar magnetization of the ring is sufficient to magnetize all the axial crenellations 14b identically, which also guarantees a narrow spread in the value of magnetic field along the circumference of the ring. The structure of the encoder element 8 according to the invention gives other advantages, notably:

a very clean break in the magnetic field lines between the zones situated in line with the windows 13c and in line with the radial strips 13d which separate the windows of the target 13;

constant dimensional and magnetic characteristics at each window 13c of the target by virtue of the identical size of these windows and of the constant width of the strips 13d which separate these windows, all of which make it possible to obtain a signal of good quality which is stable and reliable.

Furthermore, since the bipolar ring 14 is axially imbricated in the ferromagnetic target 13, the thickness of the metal sheet used to produce the said target does not increase the axial size of the encoder element 8 overall.

We claim:

1. An encoder element for integrally mounting to a rotating race of a rolling-contact bearing equipped with an information sensor assembly and having an axis of rotation, such that the encoder element will interact with a sensor of the information sensor assembly in order to indicate the speed of rotation of the bearing, the encoder element comprising:

an annular target made of ferromagnetic material, the annular target being provided
with a cylindrical bearing surface for mounting the annular target on the rotating race of the bearing and
with a disc-shaped radial part having windows of identical size which are uniformly distributed along a circular path; and a bipolar ring having a first axial side and a second axial side opposite the first axial side,
the second axial side being provided with axial teeth which are uniformly and circumferentially distributed and which penetrate axially into the windows in the target,
the bipolar ring being axially magnetized such that the teeth have a first polarity and the second axial side has a second polarity which is opposite the first polarity.

2. An encoder element according to claim 1, further including a seal overmoulded onto the bipolar ring and the radial part of the ferromagnetic target.

3. An encoder element according to claim 1,
further including a seal overmoulded onto the radial part of the ferromagnetic target, the seal having an axial bearing surface provided with a circumferential annular groove, and
wherein the bipolar ring has an annular bead or lugs,
such that the bipolar ring may be mounted to the seal by snap-fitting the annular bead or lugs into the annular groove in the seal.

4. An encoder element according to claim 1, wherein the bipolar ring is bonded onto the ferromagnetic target.

5. An encoder element according to claim 1, wherein
the bipolar ring is directly overmoulded onto the ferromagnetic target, and
the teeth have free ends which include radial tabs for maintaining the target axially integral with the bipolar ring.

6. An encoder element according to claim 1, wherein the windows are rectangular.

7. A bearing comprising:
an information sensor assembly;
an outer rotating race; and
an encoder element according to claim 1 mounted to the outer rotating race.

8. A bearing comprising:
an information sensor assembly;
an inner rotating race; and
an encoder element according to claim 1 mounted to the inner rotating race.

9. An encoder element according to claim 2, wherein the bipolar ring is bonded onto the ferromagnetic target.

10. An encoder element according to claim 3, wherein the bipolar ring is bonded onto the ferromagnetic target.

11. An encoder element according to claim 2, wherein the windows are rectangular.

12. An encoder element according to claim 3, wherein the windows are rectangular.

13. An encoder element according to claim 4, wherein the windows are rectangular.

14. An encoder element according to claim 5, wherein the windows are rectangular.

15. A bearing comprising:
an information sensor assembly;
an outer rotating race; and
an encoder element according to claim 2 mounted to the outer rotating race.

16. A bearing comprising:
an information sensor assembly;
an outer rotating race; and
an encoder element according to claim 3 mounted to the outer rotating race.

17. A bearing comprising:
an information sensor assembly;
an outer rotating race; and
an encoder element according to claim 4 mounted to the outer rotating race.

18. A bearing comprising:
an information sensor assembly;
an outer rotating race; and
an encoder element according to claim 5 mounted to the outer rotating race.

19. A bearing comprising:
an information sensor assembly;
an outer rotating race; and
an encoder element according to claim 6 mounted to the outer rotating race.

20. A bearing comprising:
an information sensor assembly;
an inner rotating race; and
an encoder element according to claim 2 mounted to the inner rotating race.

* * * * *